(12) United States Patent
Guirlinger

(10) Patent No.: US 6,945,546 B2
(45) Date of Patent: Sep. 20, 2005

(54) TOOL ORGANIZER

(76) Inventor: Edward G. Guirlinger, 5868 Kitzmiller Rd., New Albany, OH (US) 43054

( * ) Notice: Subject to any disclaimer, the term of this patent is extended or adjusted under 35 U.S.C. 154(b) by 0 days.

(21) Appl. No.: 10/667,251

(22) Filed: Sep. 19, 2003

(65) Prior Publication Data

US 2005/0062244 A1 Mar. 24, 2005

(51) Int. Cl.$^7$ .................................................. B62B 1/00
(52) U.S. Cl. ..................... 280/47.19; 280/35; 280/47.35
(58) Field of Search .............................. 280/47.19, 638, 280/35, 651, 47.11, 47.34, 47.35, 47.26; 312/249.8, 902, 328, 324, 284, 140.3; 206/373, 376, 378

(56) References Cited

U.S. PATENT DOCUMENTS

| | | | | | |
|---|---|---|---|---|---|
| 2,525,208 | A | * | 10/1950 | Clink | 312/107 |
| 3,749,233 | A | * | 7/1973 | McCormick, Jr. | 206/373 |
| 4,281,843 | A | * | 8/1981 | Johnson et al. | 280/47.26 |
| 4,460,085 | A | * | 7/1984 | Jantzen | 206/349 |
| 5,013,055 | A | * | 5/1991 | Labrum | 280/47.19 |
| 5,152,441 | A | * | 10/1992 | Torena | 224/153 |
| 5,378,005 | A | * | 1/1995 | Norton | 280/47.26 |
| 5,588,659 | A | * | 12/1996 | Boes et al. | 280/47.19 |
| 5,634,649 | A | * | 6/1997 | Breining et al. | 280/47.35 |
| D408,606 | S | * | 4/1999 | Hurt | D34/24 |
| 5,893,572 | A | * | 4/1999 | Parks | 280/47.18 |
| D409,346 | S | * | 5/1999 | Hurt | D34/24 |
| 5,951,129 | A | * | 9/1999 | Stein | 312/249.3 |
| 6,386,559 | B1 | * | 5/2002 | Souza | 280/47.26 |
| 6,390,298 | B1 | * | 5/2002 | Garro | 206/378 |
| 6,578,938 | B2 | * | 6/2003 | Norman et al. | 312/290 |
| 2003/0227148 | A1 | * | 12/2003 | Shipman et al. | 280/47.34 |

* cited by examiner

Primary Examiner—J. Allen Shriver
(74) Attorney, Agent, or Firm—Robert R. Lech

(57) ABSTRACT

A tool organizer is disclosed. According to one embodiment, the tool organizer comprises a frame and a plurality of wheels attached to the frame. The tool organizer also includes a tool storage structure supported by the frame. The tool storage structure comprising a plurality of storage panels, each storage panel comprises at least one tool fastener and associated tool indicia for securing and identifying a specific tool. The plurality of storage panels are movable with respect to one another between a closed configuration and an open configuration. A modular tool organizer, a tool set transportation system, a tool bag and a method for inspecting a set of tools stored within a tool organizer are also disclosed.

15 Claims, 16 Drawing Sheets

TOOL ORGANIZER

BACKGROUND OF THE INVENTION

1. Field of the Invention

The present invention relates generally to portable tool boxes, chests, containers and organizers for storing, transporting and organizing sets of tools. Specifically, the present invention relates to a wheeled tool organizer having vertical tool supports which may be disposed in an open or closed configuration, facilitating a visual inspection of all tools when disposed in the open configuration.

2. Description of the Related Art

Portable tool boxes and tool cabinets are well known for storing and transporting tool sets. For example, U.S. Pat. No. 5,378,005 describes a portable tool truck invented by George Norton. The '005 device comprises a plastic body with a compartment formed in the front face of the body adapted to retain tools therein, and two doors mounted on either side of the body. The doors pivot in opposite directions into an overlapping arrangement that seals off the compartment formed by the face of the body. While the invention of Norton is adequate for retaining and transporting tools, it does not facilitate taking a visual inventory of all of the tools retained therein. Further, the invention of Norton fails to provide a specific place for each tool of a tool set.

SUMMARY OF THE INVENTION

Advantages of the Invention

The present invention provides numerous advantages and benefits over prior art tool organizers. Specifically, the present invention facilitates more efficient off-site maintenance activities by reducing the need for multiple trips due to lost or forgotten tools. The present invention provides a uniform standard for tool sets. The present invention further facilitates reduced theft, loss and inventory shrinkage.

It is another advantage of the present invention that it may be disposed in an open configuration to enable a visual inspection and inventory of tools stored within the tool organizer.

It is a further advantage of the present invention that the tool organizer includes a tool fastener and tool indicia for each specific tool of a particular tool set. This enables the owner or manager of a tool set to quickly visually inspect the contents of the tool organizer to determine whether the tool set is complete. Specifically, one may determine and precisely identify any missing tools.

According to a first aspect of the present invention, a first example tool organizer is provided. The tool organizer includes a frame and a plurality of wheels attached to the frame. The tool organizer also includes a tool storage structure supported by the frame. The tool storage structure comprises a plurality of storage panels. Each storage panel includes at least one tool fastener for securing a tool. The plurality of storage panels are movable with respect to one another between a closed configuration and an open configuration.

According to a second aspect of the present invention, a second example tool organizer is provided. The second example tool organizer is modular and includes a modular frame comprising a plurality of removably assembled frame components, and at least one tool module adapted to be removably attached to the modular frame. Each tool module comprises at least one tool fastener and at least one corresponding tool indicia associated with each tool fastener.

According to a third aspect of the present invention, a tool set transportation system is provided. The tool set transportation system includes a frame component, a travel base and at least one tool module. The frame is a portion of a modular frame. The travel base is adapted to support the frame component, and the tool module is adapted to be removably attached to the frame component.

According to a fourth aspect of the present invention, a tool bag is provided. The tool bag includes a plurality of tool fasteners and a means for attaching the tool bag to a tool organizer. Each tool fastener of the tool bag includes an associated tool indicia.

According to a fifth aspect of the present invention, a method for monitoring a tool set is provided. The method includes configuring a tool organizer, containing at least a portion of a tool set, in an open configuration. The method also includes visually inspecting the contents of the tool organizer to determine a first level of completeness of the tool set. The first level of completeness is recorded, and the tool organizer and its contents are released to a third party.

The method further includes receiving the tool organizer and returned contents from the third party, configuring the tool organizer in an open configuration and visually inspecting the returned contents of the tool organizer to determine a second level of completeness of the tool set. The second level of completeness is compared to the first level of completeness to determine whether one or more tools from the tool set are missing.

The objects, features and advantages of the present invention are readily apparent from the following description of the preferred embodiments when taken in connection with the accompanying drawings.

BRIEF DESCRIPTION OF THE DRAWINGS

Comprehension of the invention is facilitated by reading the following detailed description, in conjunction with the associated drawings, in which.

DRAWING REFERENCE NUMERALS

Figure 1:
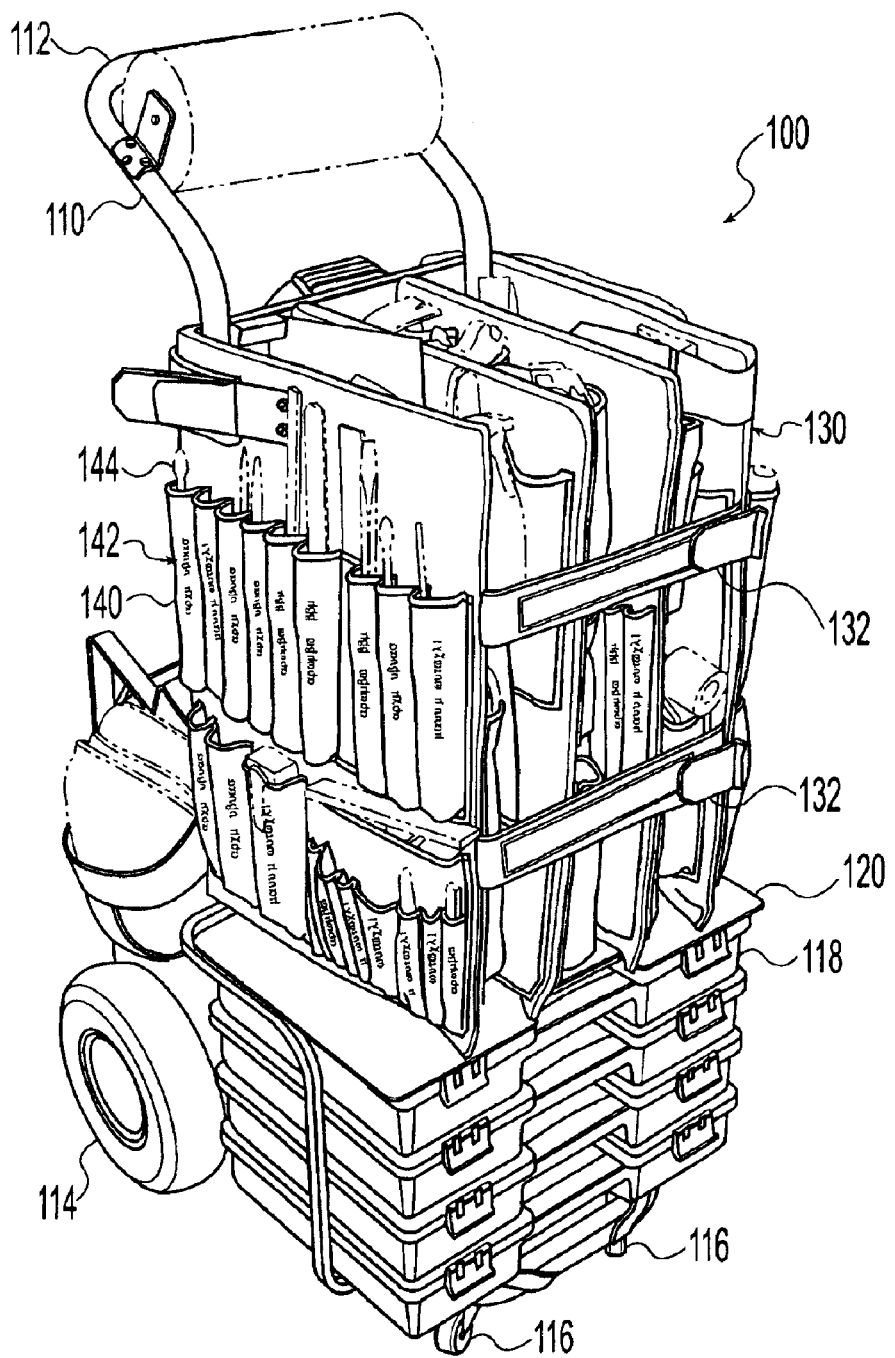
FIG. 1 is a perspective view of a first example tool organizer disposed in a closed configuration in accordance with the present invention.

The following reference characters identify the associated elements depicted in the drawings describing the present invention 100 Tool organizer
110 Frame
112 Handle
114 Rear wheel
116 Front wheel
118 Parts box
120 Load bearing step
124 Storage bin
130 Vertical tool support
132 Retaining means
140 Tool fastener
142 Tool indicia
144 Tool
150 Protrusion
155 Retaining means
400 Tool belt
410 Belt portion
412 First belt end
414 Second belt end
416 Pad
418 Tool belt handle
420 Tool support
1000 Modular tool organizer
1012 Handle
1014 Tray
1016 Pin
1018 Hinge
1020 Rear wheel
1022 Front wheel
1024 Storage box
1030 Tool support handle
1032 Tool support retainer
1040 Tool fastener
1042 Tool indicia
1112 First tool module
1114 Second tool module
1116 Upper frame component
1118 Lower frame component
1120 A/B Knob
1122 Tool support
1124 A/B Bracket
1126 A/B Supporting cross-member
1202 Step
1204 Brake lever
1302 Travel base
1304 Seat
1306 Seat belt
1308 A/B Prongs
1310 A/B Receptacles
1402 Removable tool carrier
1404 Storage compartment
1406 Handle
1502 Handle
1504 A/B Attachment hooks
1506 Shoulder strap

DETAILED DESCRIPTION OF THE DRAWINGS

Referring now to the drawing figures, there is illustrated in FIG. 1, a first example tool organizer 100 embodying the present invention. Tool organizer 100 is intended to contain a predetermined set of tools for use by a professional or hobbyist at a location within or away from a work shop. Tool organizer 100 comprises a frame 110 including a handle 112. The frame 110 is supported by two rear tires 114 and two front casters 116. The frame 110 supports several parts storage boxes 118 for containing miscellaneous tools, machine parts, work pieces and/or accessories that may be commonly needed by the user.

Tool organizer 100 includes a set of storage panels or vertical tool supports 130 for storing a specific set of tools. The specific set of tools may be selected based on the typical activities of the user. For example, the tool organizer 100 may be populated with a first set of tools for a plumber, a second set of tools for an electrician, or a third set of tools for a general maintenance worker. In the illustrated embodiment, each vertical support includes a rigid inner structure and an outer fabric covering which forms one or more tool fasteners 140 to hold a tool 144. Each tool fastener 140 has a specific size and shape so as to properly contain a specific tool 144 and includes a tool indicia 142 indicating the specific tool 144 which is associated with the tool fastener 140. Each tool fastener 140 of the example tool organizer 100 is a pocket into which a specific tool 144 may be placed and stored. Of course, other types of tool fasteners 140 may be contemplated, such as loops, straps, velcro, and hooks, for example.

Figure 2:
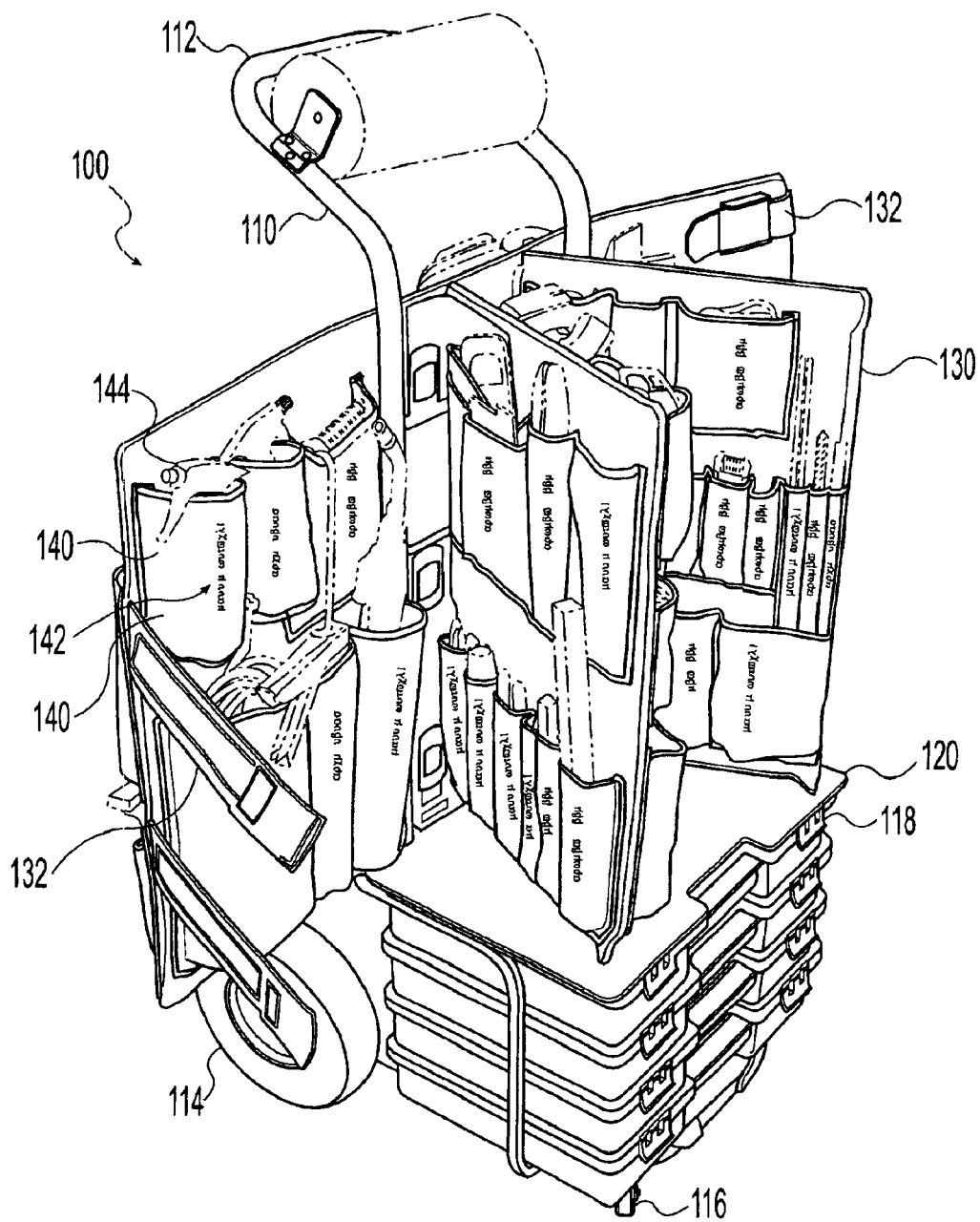
FIG. 2 is a perspective view of the tool organizer of FIG. 1 disposed in an open configuration.
Figure 3:
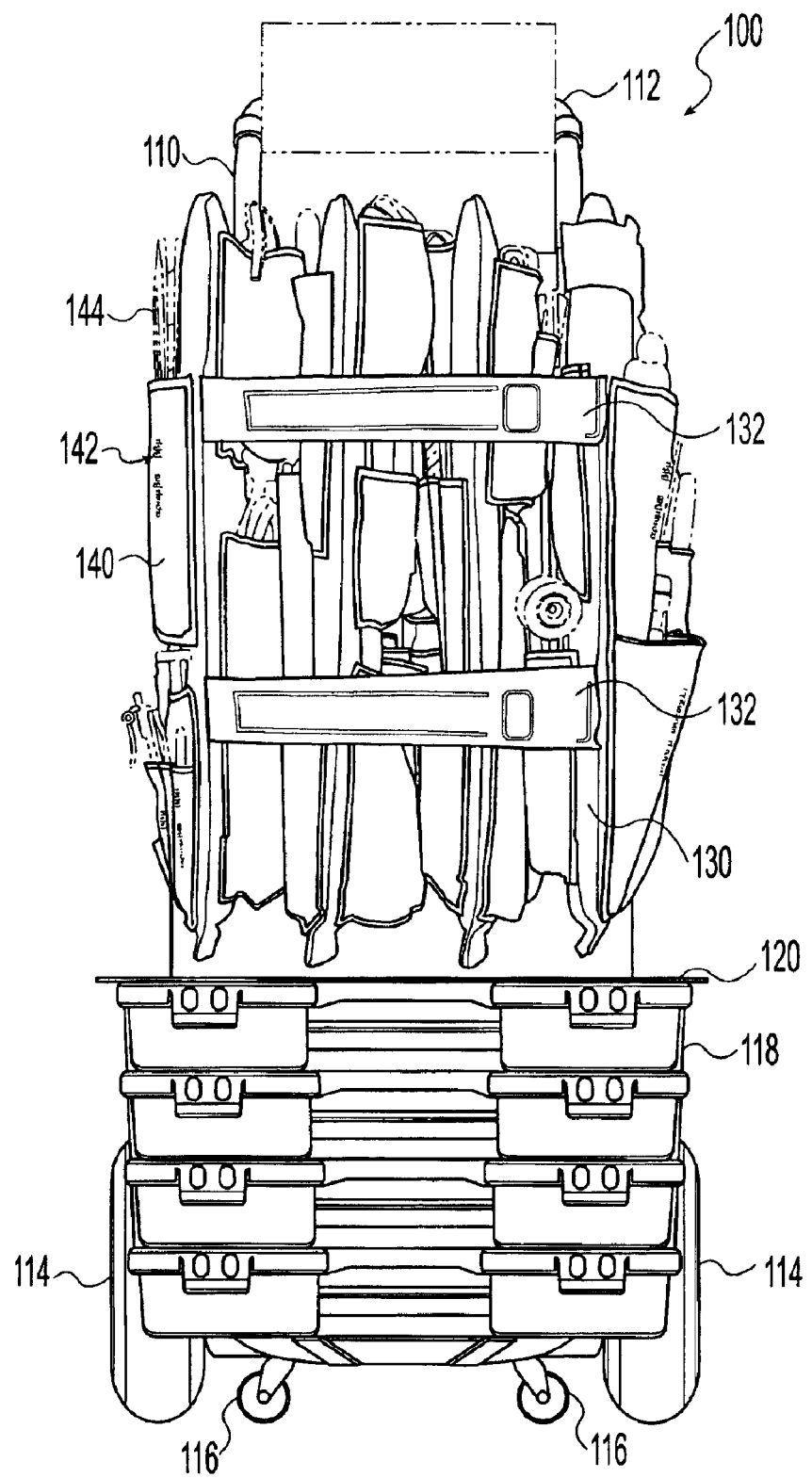
FIG. 3 is a front view of the tool organizer of FIG. 1.
Figure 4:
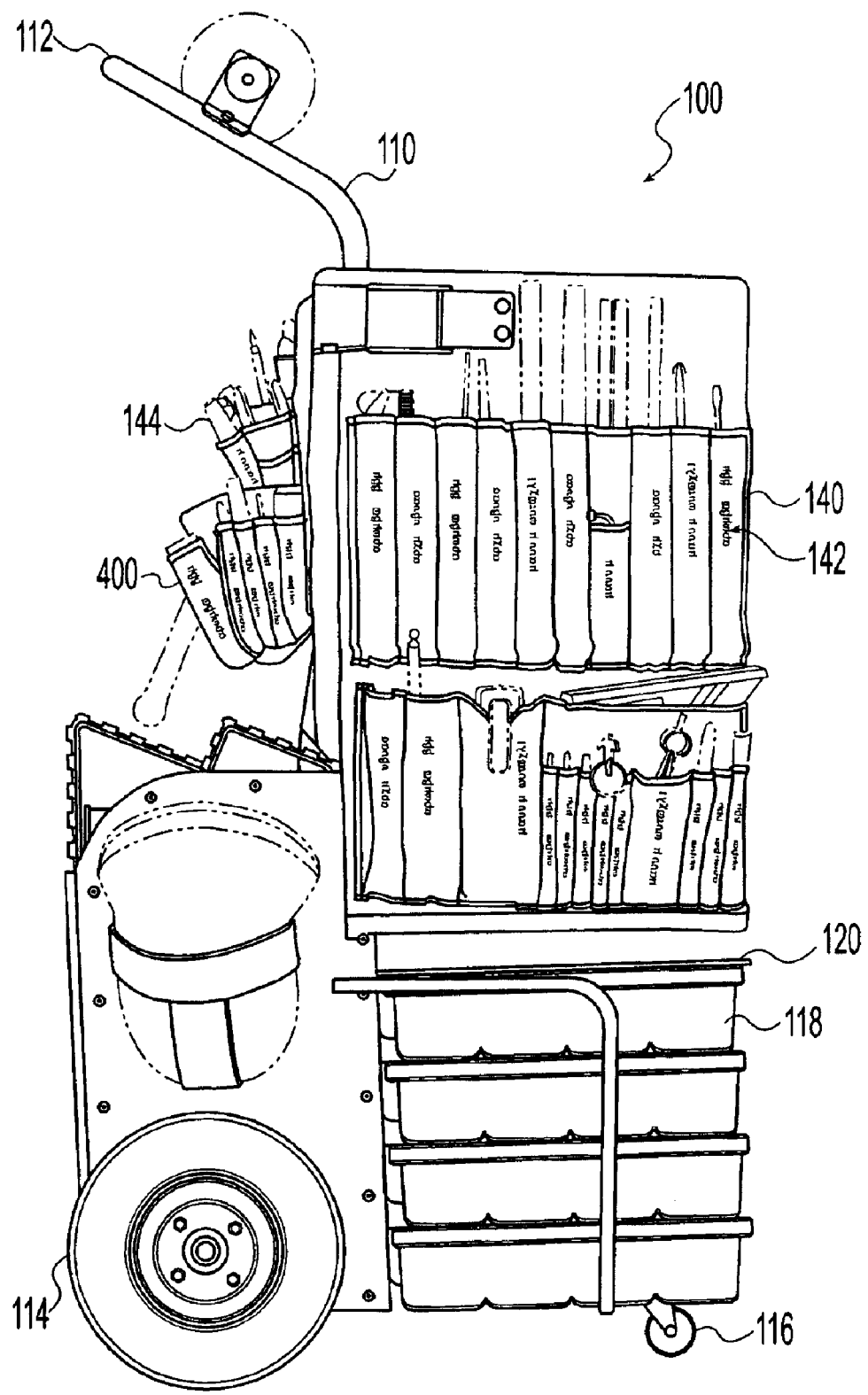
FIG. 4 is a side view of the tool organizer of FIG. 1.

The tool organizer 100 may be disposed in a closed configuration, as illustrated in FIGS. 1, 3 and 4, or in an open configuration, as described more fully below with reference to FIGS. 2 and 6. The tool organizer may be disposed in the closed configuration by securing the vertical tool panels 130 using a panel retaining means 132. In the illustrated embodiment, the panel retaining means 132 are straps that employ hook and loop fasteners, commonly referred to as velcro. Of course, retaining means of other types, including snap fasteners, buckles and hasps, for example, are acceptable substitutes.

Figure 6:
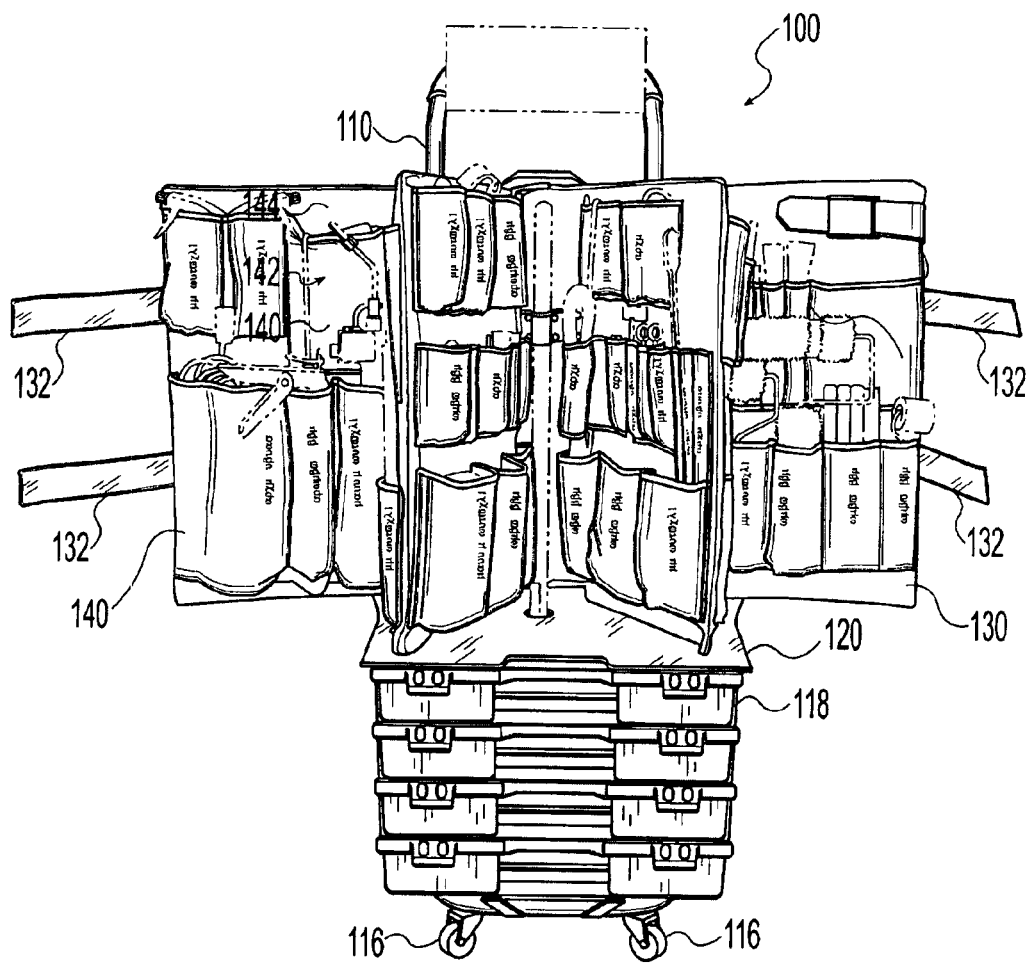
FIG. 6 is a front view of the tool organizer of FIG. 1.
Figure 7:
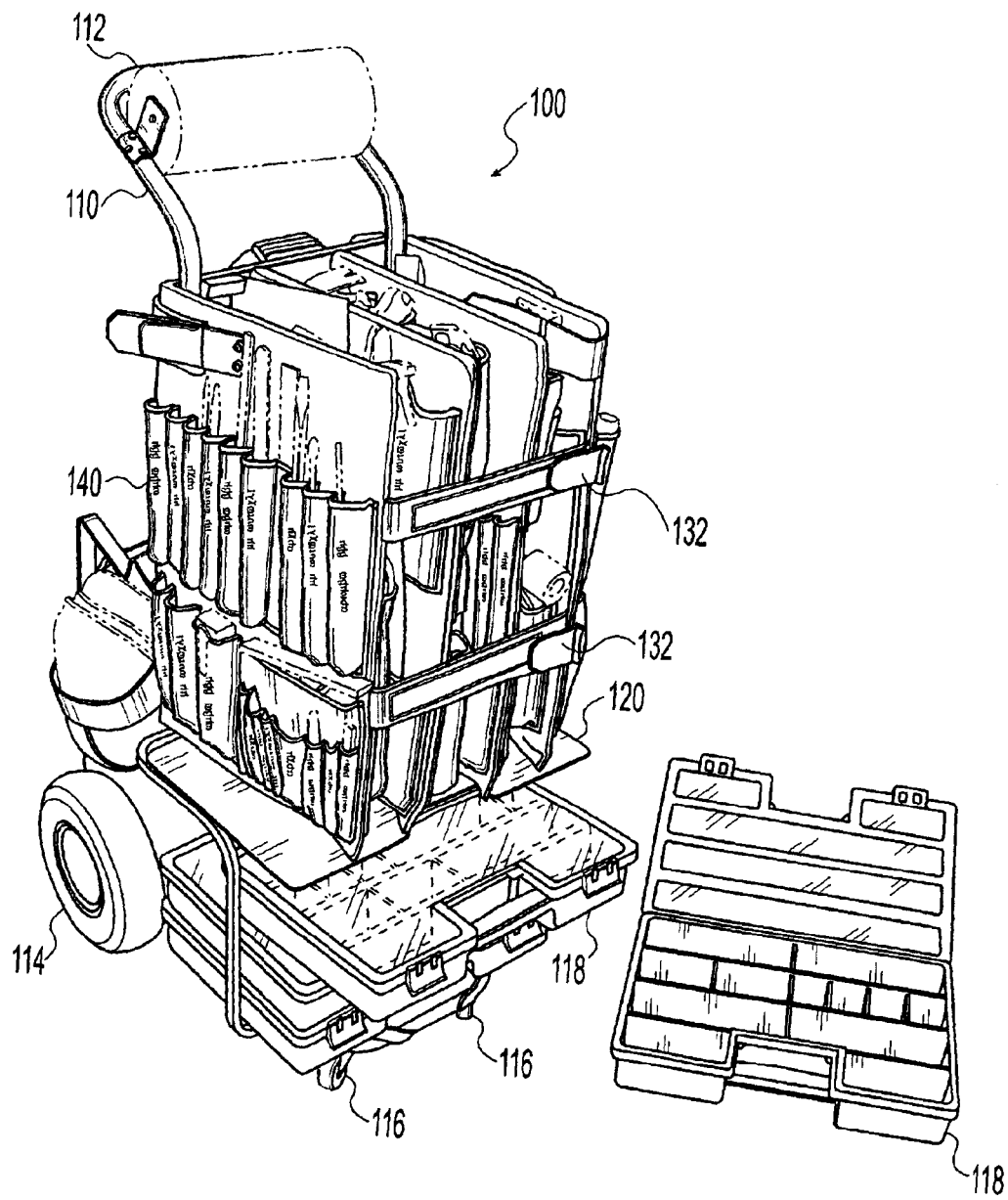
FIG. 7 is a perspective view of the tool organizer of FIG. 1 with a storage drawer removed.
Figure 8:
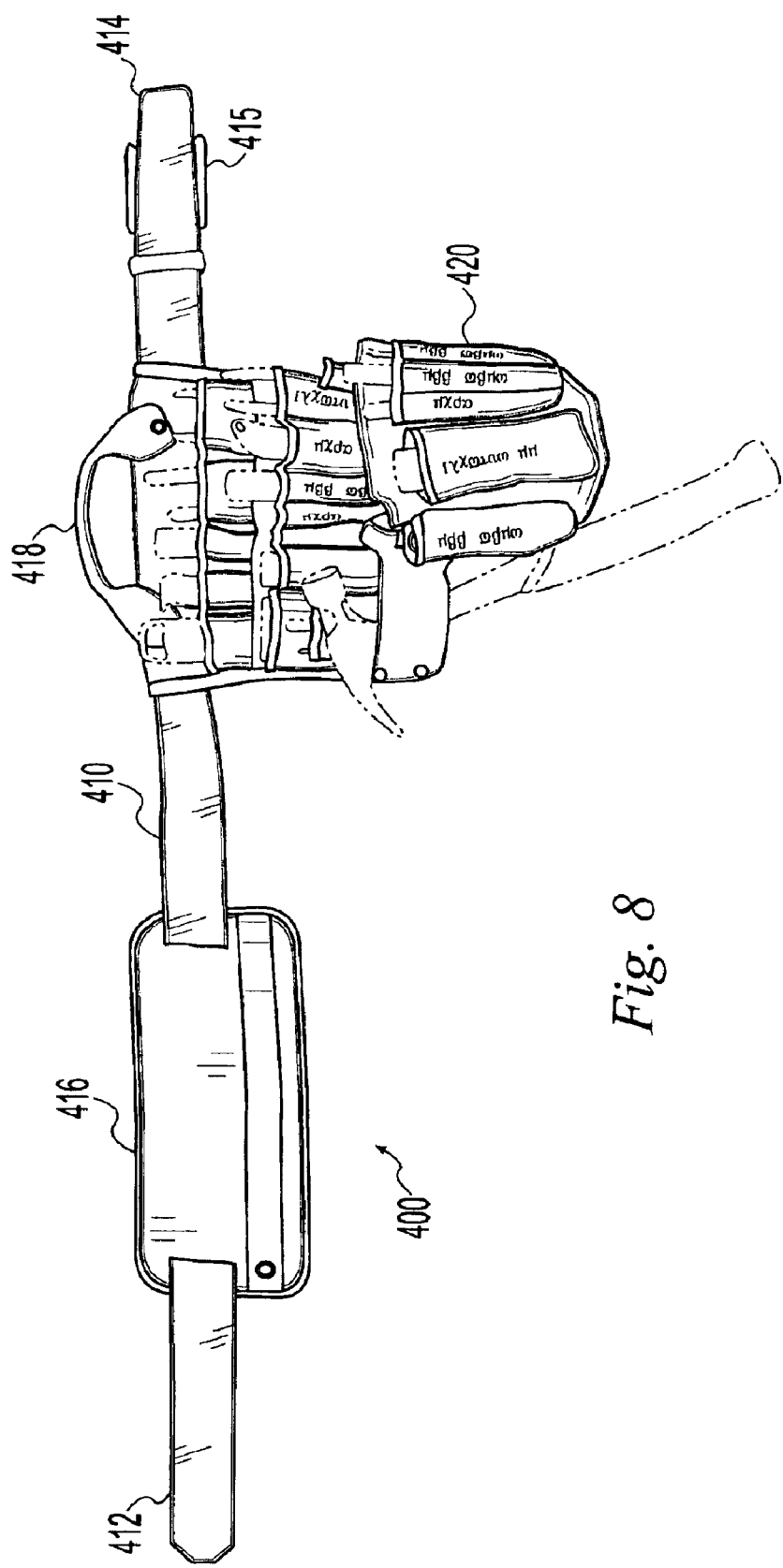
FIG. 8 is a plan view of the tool belt of the tool organizer of FIG. 1.

Referring now to FIGS. 2 and 6, by releasing the retaining means 132, the user can open the vertical tool panels 130 of the tool organizer 100. This enables the user to visually detect every tool 144 of the particular tool set contained within the tool organizer 100, and note any missing tools using the associated indicia.

According to one aspect of the present invention, a method is presented for using the example tool organizer 100 to facilitate an inspection and/or inventory process to efficiently determine a first level of completeness, i.e. to identify any missing tools from the set of tools. The method begins with disposing the tool organizer 100 in an open configuration and visually inspecting each tool fastener 140 to determine whether a tool 144 is disposed therein. The visual inspection further includes determining whether the each tool 144 disposed within a tool fastener 140 is associated with the tool indicia 142. Preferably, the tool indicia 142 is a printed tool name, although it may be an alphanumeric code or other indicia such as bar-code.

The method also includes recording the first level of completeness of the tool set, such as by noting the missing tools or tool indicia. The further includes releasing the tool organizer and contents to a third party and, at some future time, receiving the tool organizer 100 and returned contents from the third party. Again, the user configures the tool organizer 100 in an open configuration and visually inspects the returned contents of the tool organizer 100 to determine a second level of completeness of the tool set. The first and second levels of completeness are compared to determine whether one or more tools 144 from the tool set were not returned with the tool organizer 100.

Figure 5:
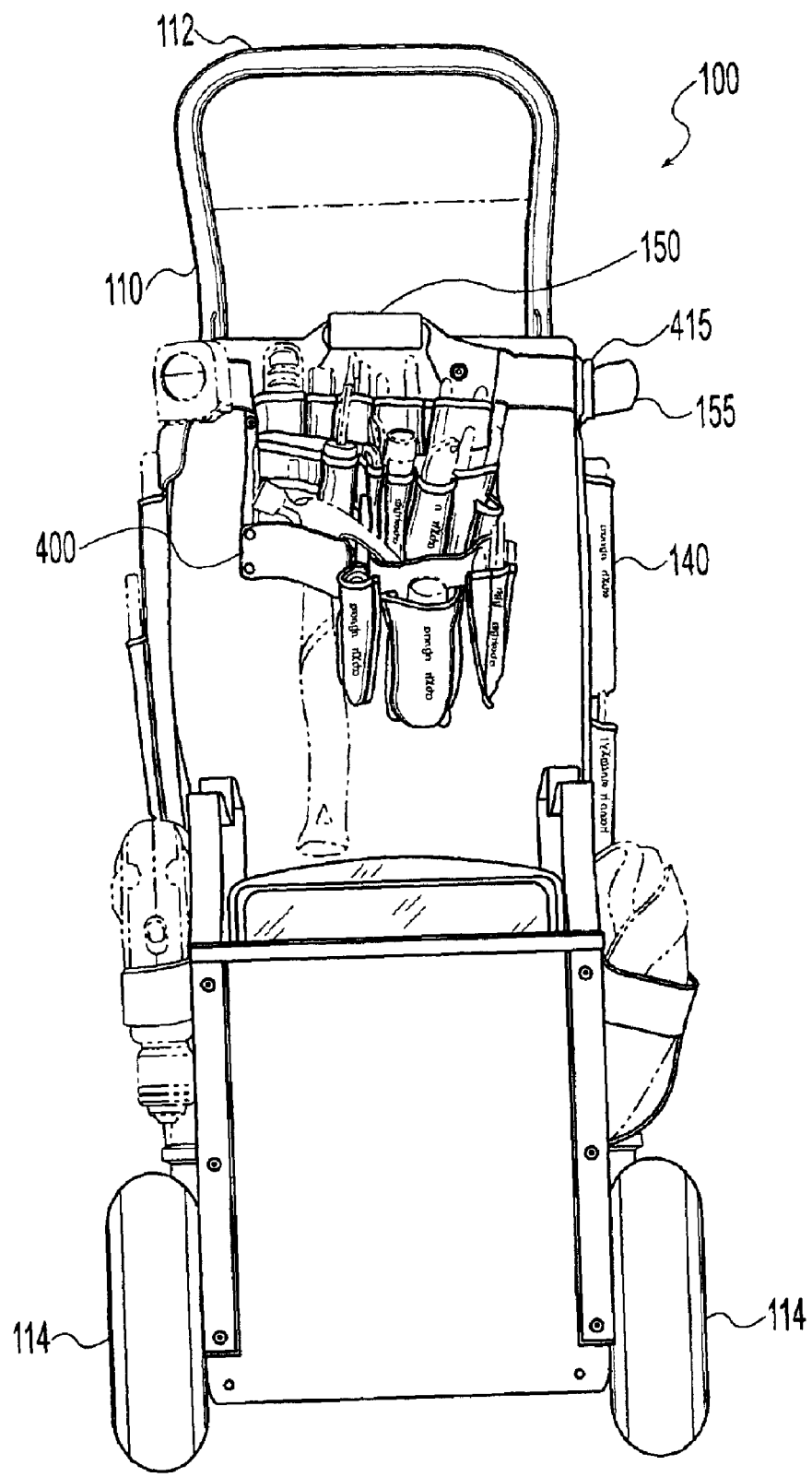
FIG. 5 is a rear view of the tool organizer of FIG. 1.

Referring now to FIGS. 4 and 5, respective side and rear views of the example tool organizer 100 are depicted. As illustrated, the tool organizer 100 includes an integrated tool belt 400 which may be detached from tool organizer 100 and used to carry a subset of the tool set apart from the tool organizer 100. In an alternate embodiment of the present invention, the tool belt 400 may be replaced by a tool bag or tool box to maintain the same accountability as the tool organizer 100.

Figure 9:
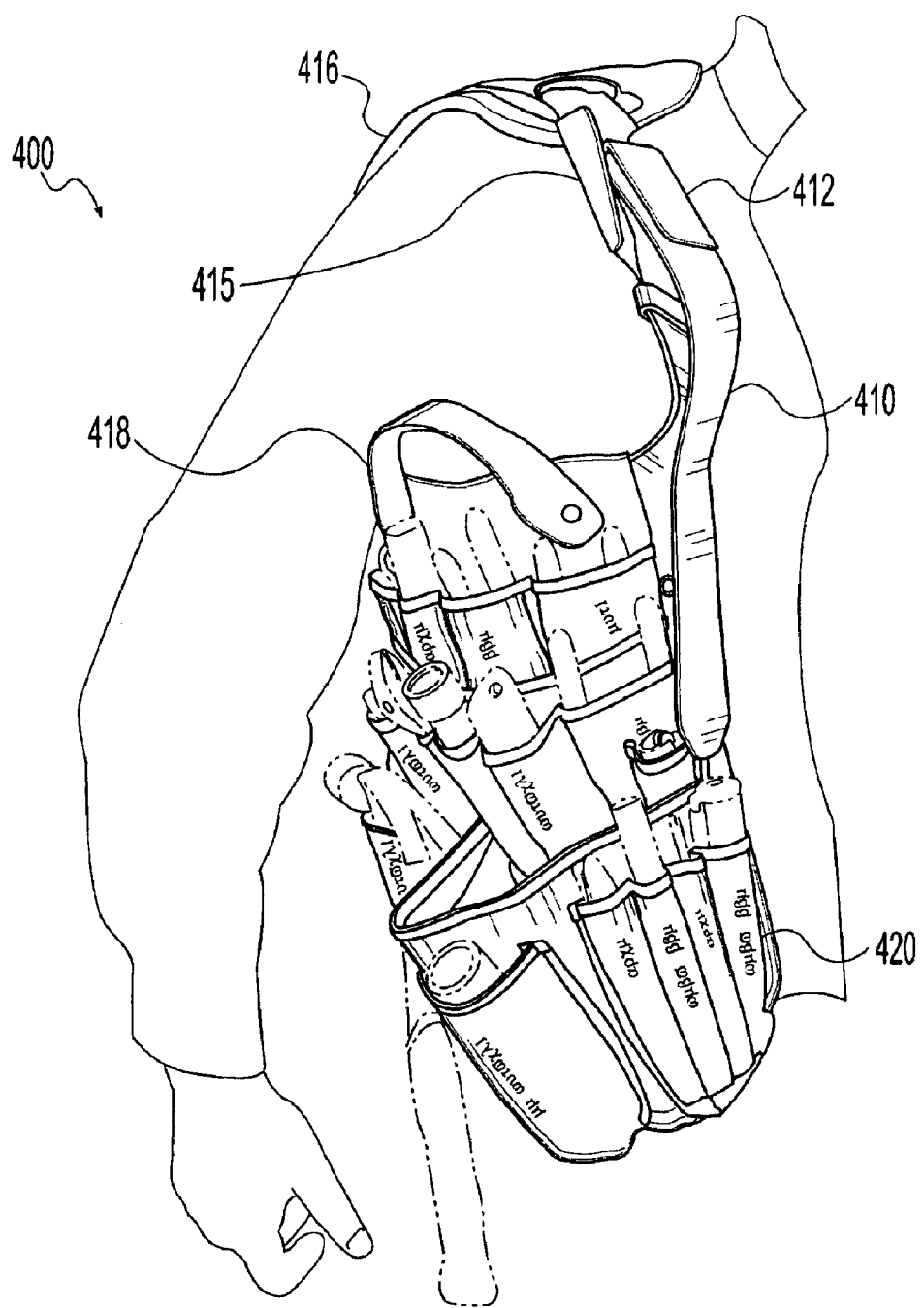
FIG. 9 is a perspective view of the tool belt of the tool organizer of FIG. 1.

Referring now to FIG. 9, there is illustrated the tool belt 400 detached from the tool organizer 100. Tool belt 400 includes a belt portion 410 having a first end 412 and a second end 414. A retaining means 415 is disposed at belt end 414. Tool belt 400 also includes a tool support 420 for holding the subset of tools and a handle 418. Like the tool fasteners of the panels of the tool organizer 100, each tool fastener of the tool belt has a particular size and shape to securely hold a specific tool, and each tool fastener of the tool belt 400 has an associated indicia of the specific tool to be stored.

When integrated with the tool organizer, the retaining means 415 of belt end 414 cooperates with a corresponding strap 155 attached to the tool organizer. Likewise, belt end 412 cooperates with a retaining means (not shown) also attached to the tool organizer 100. The weight of the tools in the tool belt 400 is further supported by handle 418 which may be looped over a correspondingly place protrusion 150 formed within the frame 110 of tool organizer 100.

Figure 10:
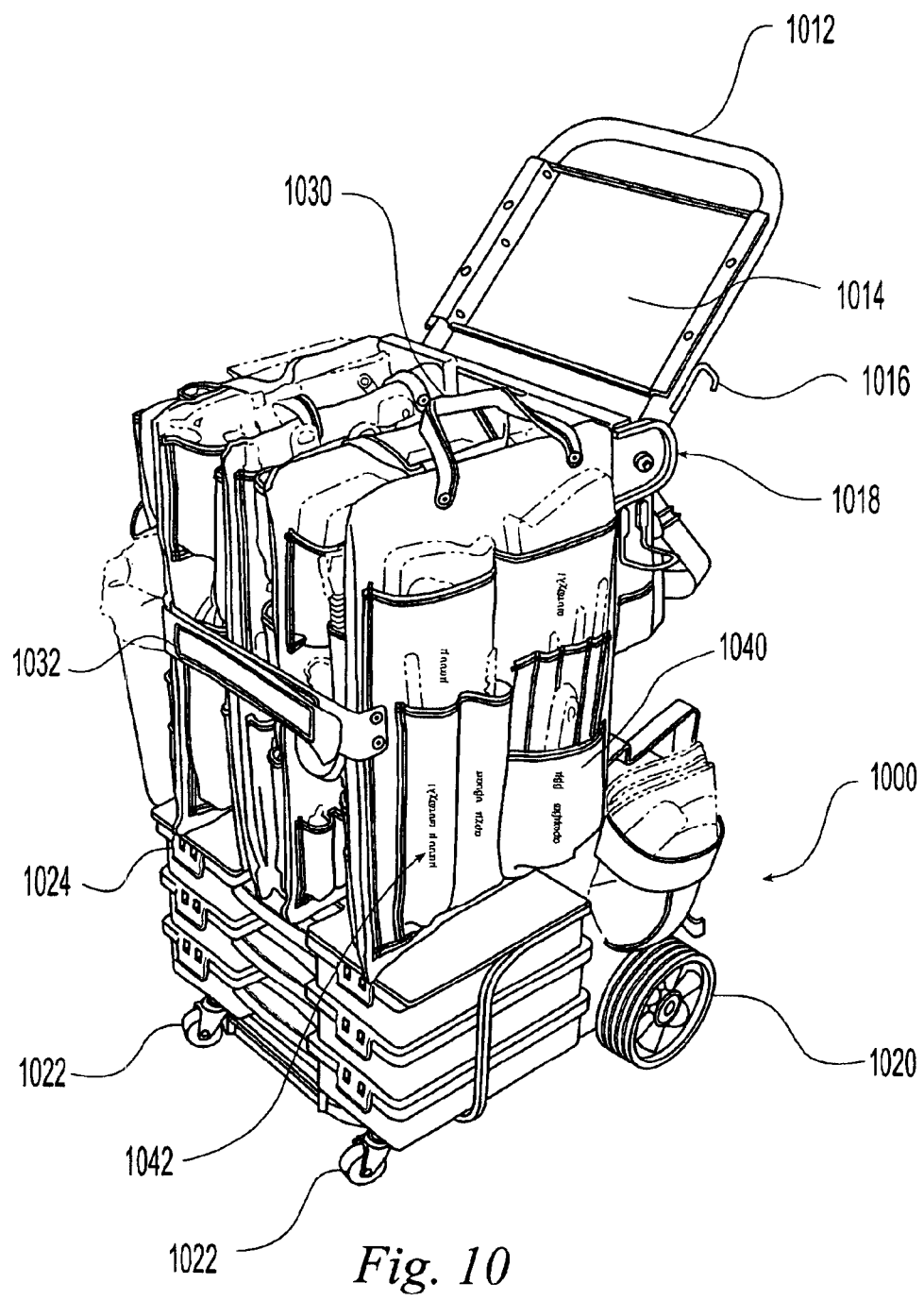
FIG. 10 is a perspective view of a second example tool organizer in accordance with the present invention.

When the tool belt 400 is not integrated with tool organizer 100, retaining means 415 may cooperate with belt end 412 to form a loop which may be placed around a user's waist or over a user's shoulder, as illustrated in FIG. 10. Tool belt 400 also includes a pad 416 to distribute pressure and provide a cushion for the user when the tool belt 400 is worn over the shoulder. Alternatively, the user may use handle 418 to carry tool belt 400.

Modular Tool Organizer

Figure 11:
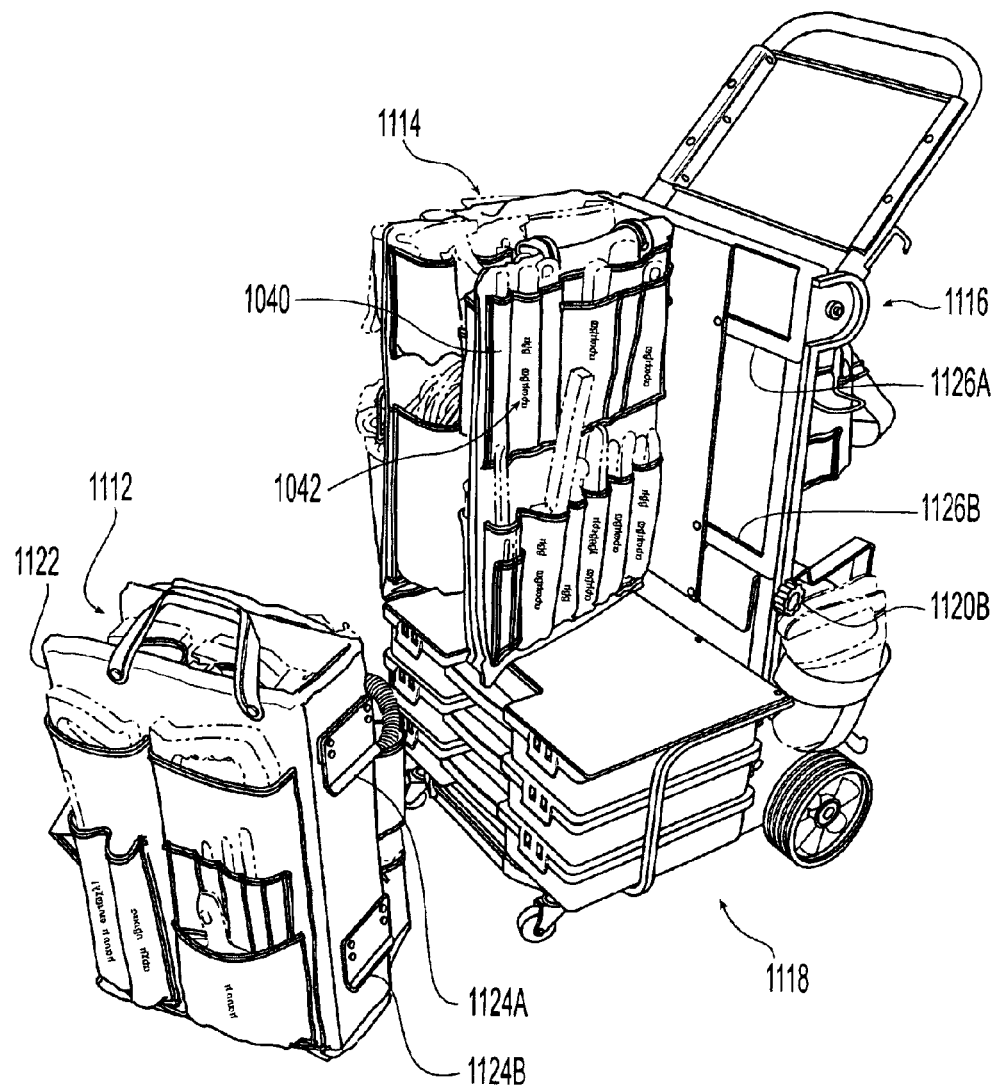
FIG. 11 is a perspective view of the tool organizer of FIG. 10 with a tool module removed.

There is illustrated in FIGS. 10 and 11, a second example tool organizer 1000 embodying the present invention. Tool organizer 1000 is particularly useful for professionals who may be required to supply a set of tools at a remote worksite. Modular tool organizer 1000 is designed to be easily placed in and removed from a passenger vehicle or truck. Modular tool organizer 1000 comprises four major components which may be disassembled to facilitate transportation and reassembled at a remote workplace. The four major components are a first tool module 1112, a second tool module 1114, an upper frame component 1116, and a lower frame component 1118.

Figure 12:
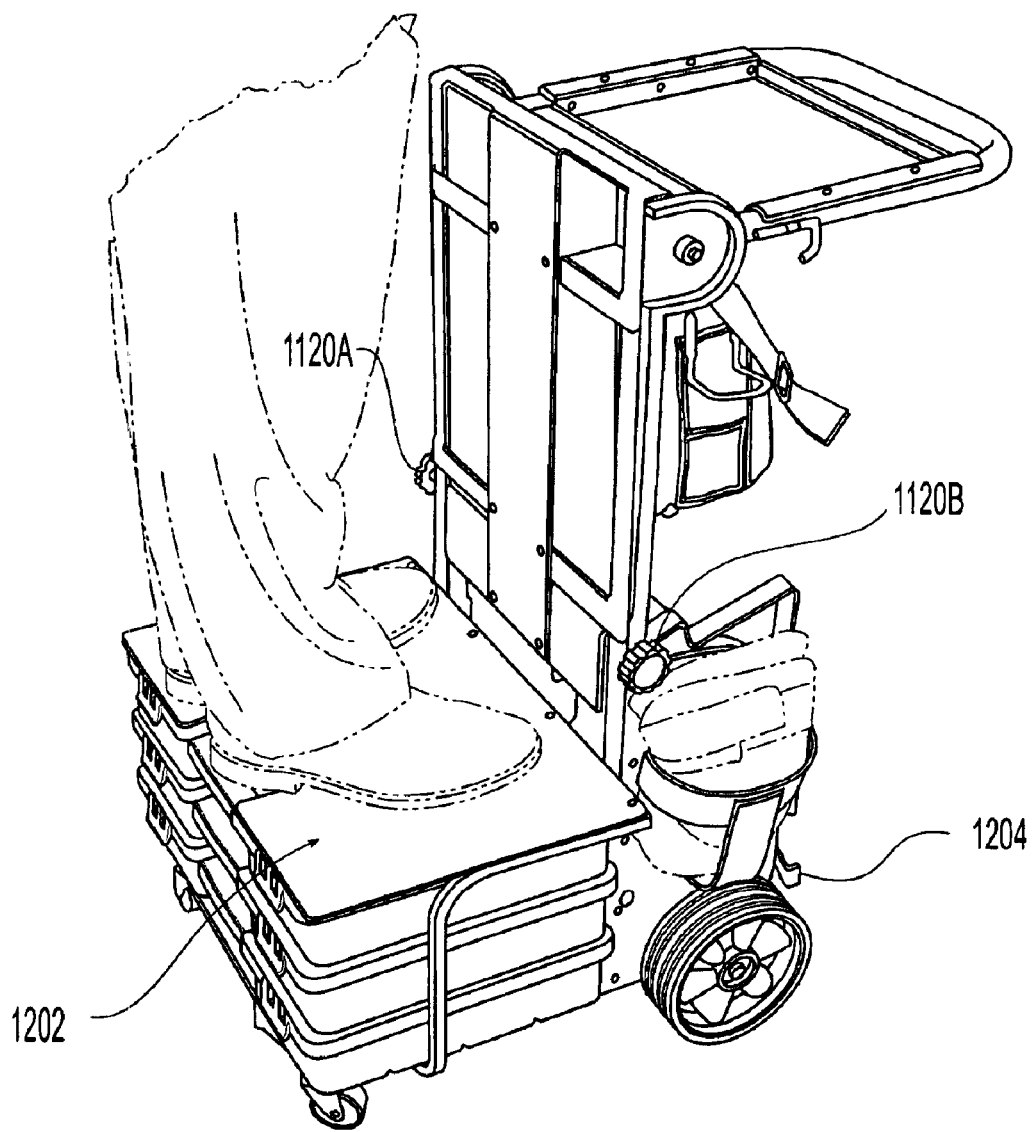
FIG. 12 is a perspective view of the tool organizer of FIG. 10 with both tool modules removed.
Figure 13:
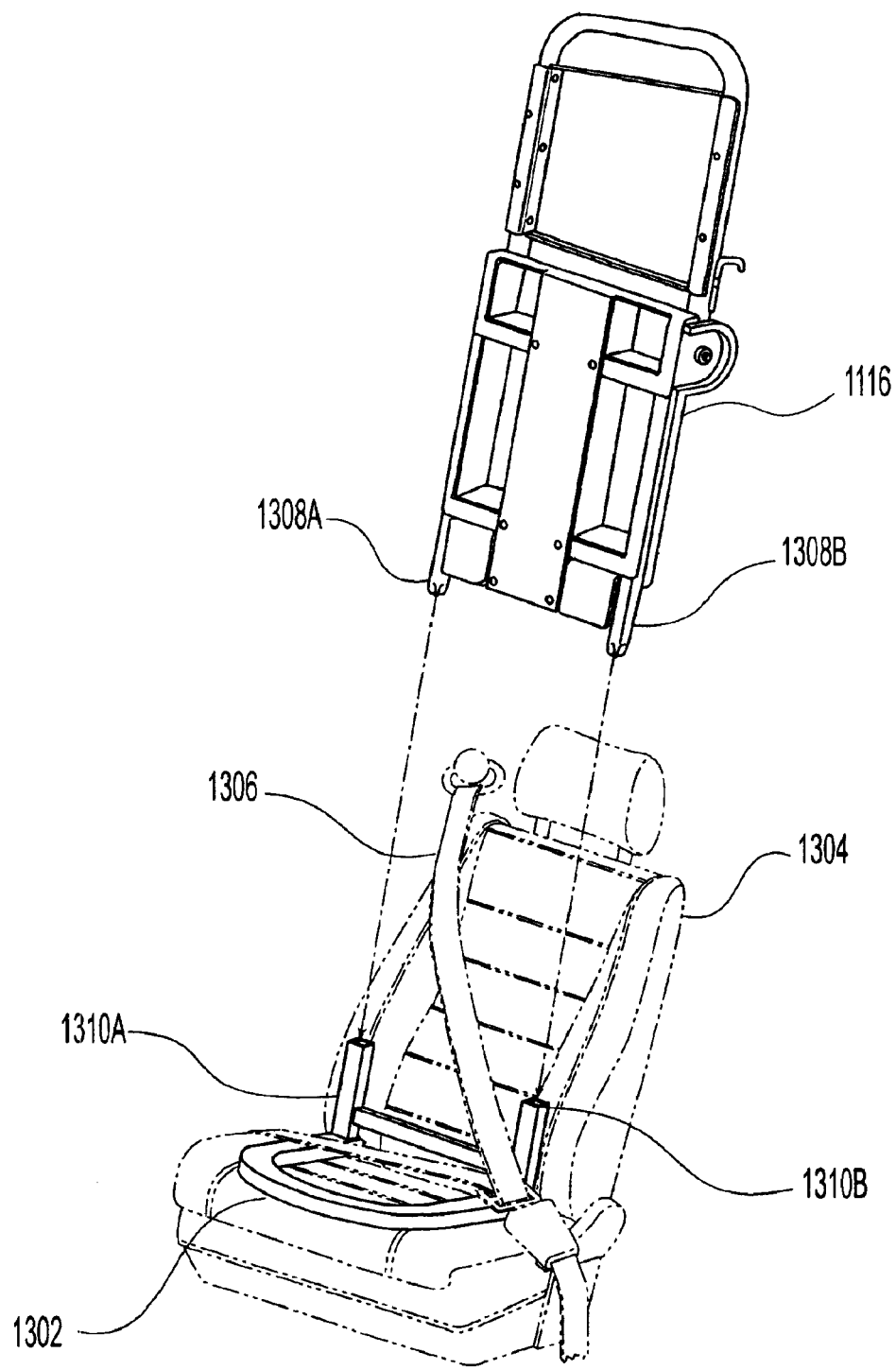
FIG. 13 is an exploded view of a seat bracket and the upper frame of the tool organizer of FIG. 10.

Upper frame component 1116 includes a handle 1012 and a tray 1014. Handle 1012 and tray 1014 are integrated into the upper frame 1116 by a hinge 1018, and they may be adjusted to any of several positions using an adjustment mechanism, such as a spring-loaded pin 1016. For example, handle 1012 may be positioned at a roughly 45 degree angle to accommodate moving and tilting the fully assembled tool organizer 1000, as shown in FIGS. 10 and 11. Handle 1012 may be positioned horizontally, as illustrated in FIG. 12, to serve as a work surface to hold tools or spare parts during a job. In yet another example, handle 1012 may also be positioned vertically to conserve space during transporting the components of the tool organizer 1000, as illustrated in FIG. 13.

Referring back to FIG. 11, the two tool modules 1112 and 1114 attach to and are supported by the upper frame component 1116. Tool module 1112, for example, attaches to the upper frame 1116 using brackets 1124A and 1124B which engage corresponding cross-members 1126A and 1126B of the upper frame component 1116. Each of the two tool modules 1112 and 1114 may be lifted and maneuvered using a tool support handle such as handle 1030, and each includes two vertical tool supports, such as tool support 1122 of tool module 1112. As in the first example embodiment, the vertical tool supports may be retained by tool support closure 1032, and each vertical support includes one or more tool fasteners 1040 to hold a tool, and each tool fastener 1040 has a specific size and shape so as to properly contain a specific tool. Each tool fastener 1040 further includes a tool indicia 1042 indicating the specific tool which is associated with the tool fastener.

Lower frame component 1118 includes two rear wheels 1020 and two front casters 1022. The lower frame component 1118 supports several parts storage boxes 1024 for holding various machine parts, work pieces and/or accessories that may be commonly needed by the user, but are typically not considered part of the tool inventory. Lower frame component 1118 includes two apertures for receiving two corresponding prongs 1308A and 1308B of upper frame component 1116. When the upper frame component 1116 is received by lower frame component 1118, the two may be secured by tightening corresponding knobs 1120A and 1120B. These attachment mechanisms enable the tool organizer 1000 to be assembled and disassembled as desired.

Referring now to FIG. 12, tool organizer 1000 is illustrated with both tool modules 1112 and 1114 removed. The removal of the tool modules facilitates the use of step 1202 which is integrated into the lower frame component 1118. The tool organizer 1000 may be stabilized using brake 1204 which prevents rotation of the rear wheels 1020.

Referring now to FIG. 13, there is illustrated a travel base 1302 which adapted to fit in a passenger seat of a car or truck, such as seat 1304. Travel base 1302 may be secured to seat 1304 using a standard passive restraint, such as seatbelt 1306. Travel base 1302 includes receptacles 1310A and 1310B which are adapted to receive corresponding prongs 1308A and 1308B of upper frame 1116. Upon securing travel base 1302 to seat 1304 and attaching upper frame component 1116 to travel base 1302, tool modules 1112 and 1114 may be attached to upper frame component 1116. The modular nature of tool organizer 1000 enables the tool organizer to be easily inserted and removed from a car or truck. By breaking the tool organizer into several modules, the weight of the assembled tool organizer and its contents may be distributed over all of the modules, each of which may be more easily lifted and maneuvered.

Figure 14:
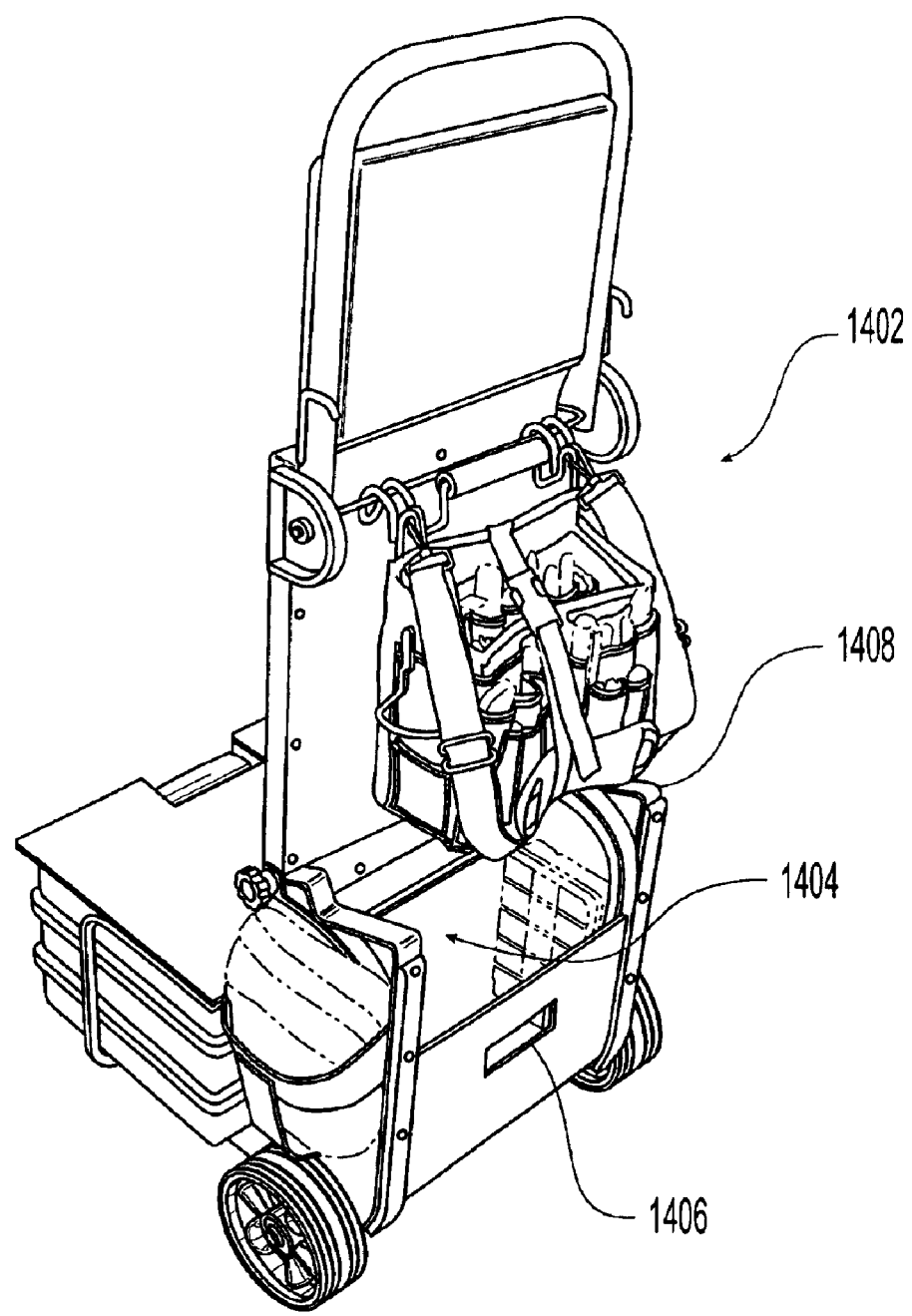
FIG. 14 is a rear perspective view of the tool organizer of FIG. 10 with both tool modules removed.
Figure 15:
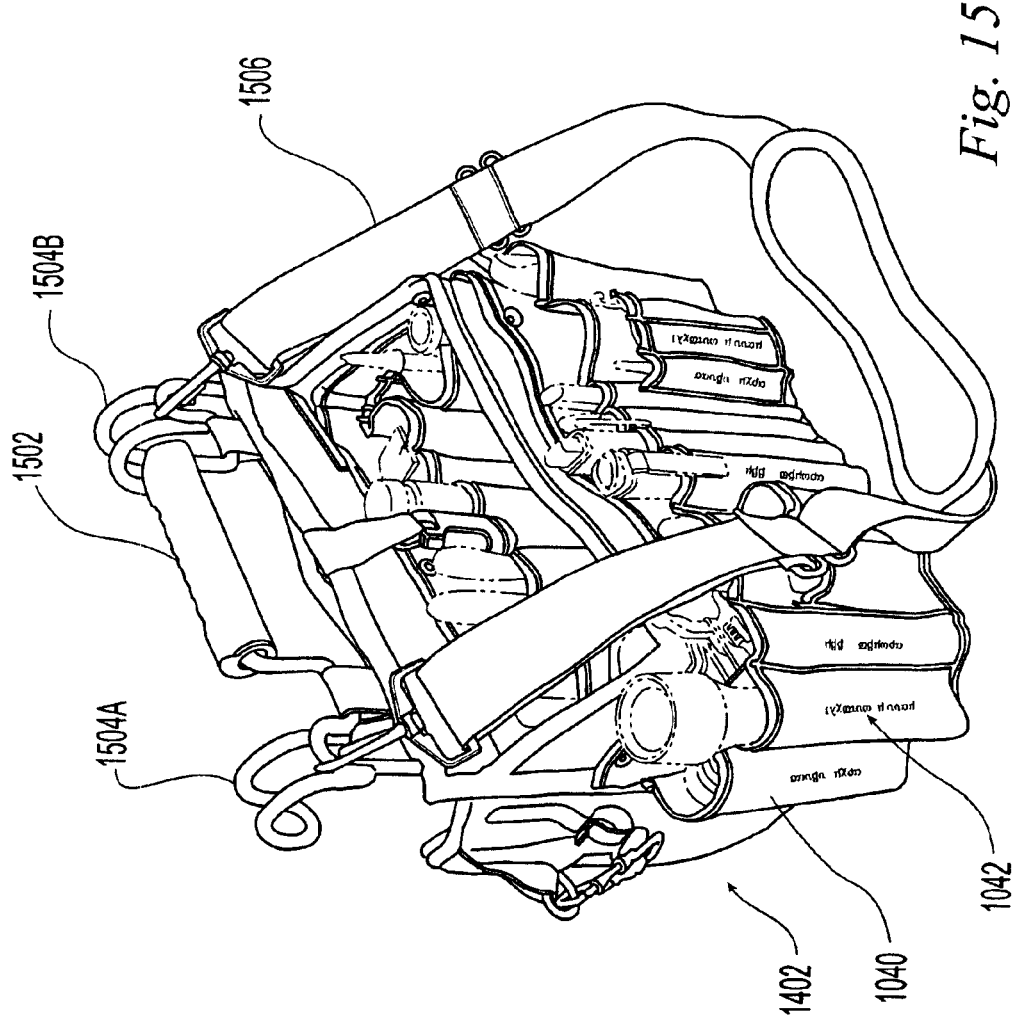
FIG. 15 illustrates the removable tool carrier of the tool organizer of FIG. 10.

Referring now to FIG. 14, a rear perspective view of tool organizer 1000 is illustrated. As shown, the lower frame 1118 includes a rear storage compartment 1404, saw horse support 1408 and a handle 1406. Handle 1406 may be used to facilitate lifting the lower frame component 1118 into and out of a transporting vehicle. Saw horse support 1408 may be used to support a piece of wood or other workpiece to facilitate cutting the wood or other workpiece. A removable tool carrier 1402, more clearly illustrated in FIG. 15, is shown attached to the rear of tool organizer 1000.

Removable tool carrier 1402 includes a handle 1502, two attachment hooks 1504A and 1504B and an adjustable shoulder strap 1506. Removable tool carrier 1402 further includes a plurality of tool fasteners. Each tool fastener has a specific size and shape so as to properly contain a specific tool. Each tool fastener further includes a tool indicia indicating the specific tool which is associated with the tool fastener.

Method for Using Tool Organizer

Figure 16:
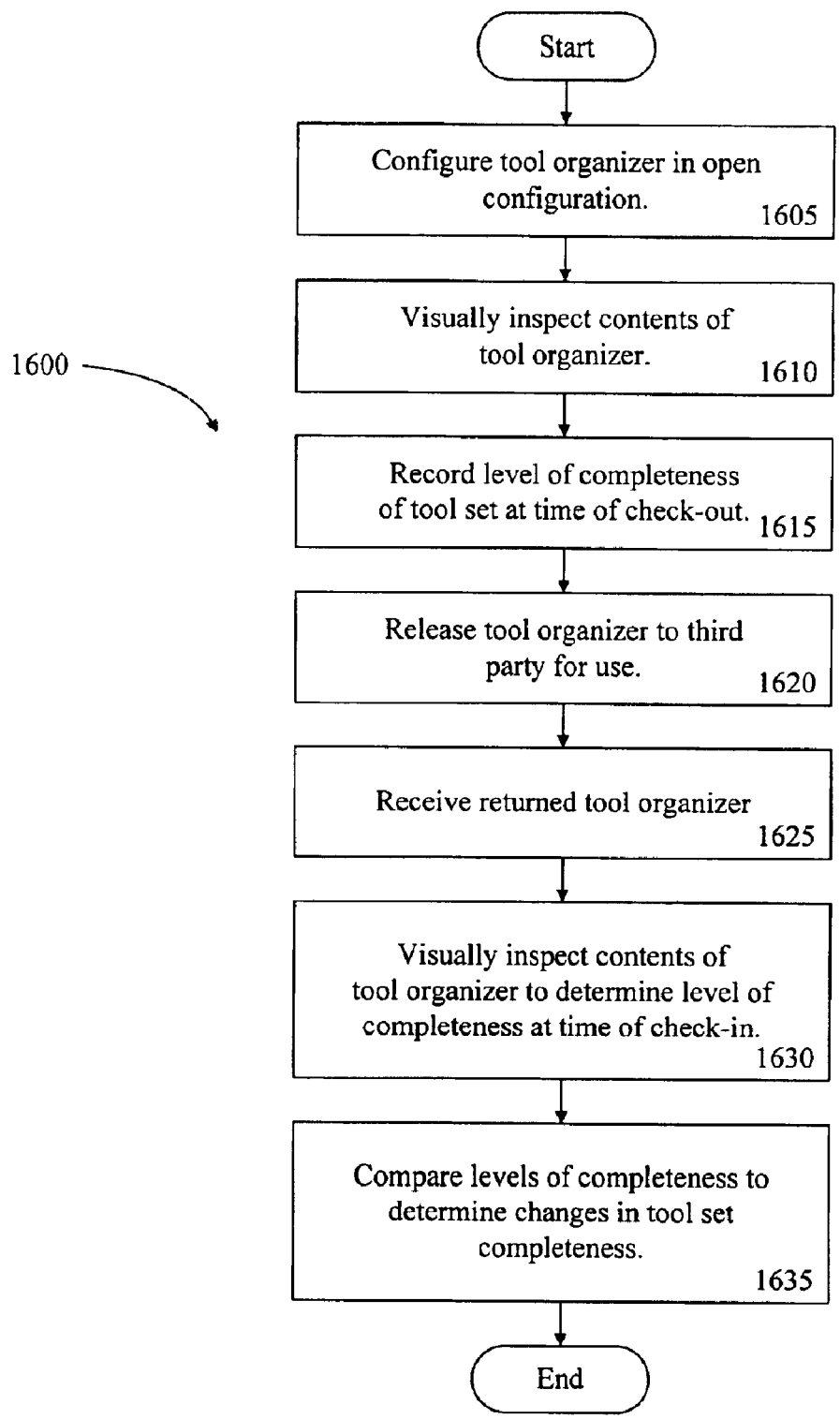
FIG. 16 is a flowchart illustrating the processing steps of an example method for accounting for a set of tools which may be checked out to a third party for use.

Referring now to FIG. 16, there is illustrated an example methodology for using the example tool organizer to track, maintain and account for a set of tools which may be checked out to a third party for use. Examples of such third parties include, for example, in-house maintenance personnel and independent contractors. At block 1605, the methodology includes configuring the tool organizer in an open configuration. By so configuring the tool organizer, every tool retained therein may be visually inspected (1610) by flipping through the vertical tool supports, similar to leafing through the pages of a book.

Upon or during the visual inspection, a level of completeness of the tool set is recorded (1615). The level of completeness may be any of a number of representations of the tool set, including a list of tools missing from the tool set, a list of tools present in the tool set, a grade according to a predetermined scale, or a set of check marks in an inventory list, for example. At block 1620, the tool organizer may be checked out or released to the third party for use.

Once the third party returns the tool organizer (1625), the contents are once again visually inspected to determine a level of completeness at the time of check-in (1630). The first and second levels of completeness are then compared to determine any changes in the tool set (1635). Appropriate actions may be taken by the owner of the tool set based on any changes to the tool set. For example, the third party may be charged for any missing tools.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A tool organizer, comprising:
   a frame;
   a plurality of wheels attached to the frame;
   a tool storage structure supported by the frame, the tool storage structure comprising a plurality of storage panels, each storage panel comprising at least one tool fastener for securing a specific tool, the tool storage structure including a tool indicia associated with each tool fastener, and the plurality of storage panels movable with respect to one another between a closed configuration and an open configuration; and
   wherein a first tool fastener and a first associated tool indicia are disposed on a first side of a first storage panel, and a second tool fastener and a second associated tool indicia are disposed on a second side of the first tool panel.

2. The tool organizer of claim 1, wherein the tool storage structure further comprises a base to which the plurality of storage panels are attached, and a plurality of hinges connecting the plurality of storage panels to the base.

3. The tool organizer of claim 1, wherein the tool storage structure further comprises at least one storage panel sleeve partially covering a storage panel, wherein the tool fastener is a pocket formed integrally with the storage panel sleeve.

4. The tool organizer of claim 1, further comprising a weight bearing step supported by the frame.

5. The tool organizer of claim 1, wherein the tool support panels are disposed vertically.

6. The tool organizer of claim 1, further including an integrated and detachable tool belt.

7. The tool organizer of claim 1, further including an integrated and detachable tool bag.

8. The tool organizer of claim 1, further including an integrated and detachable tool box.

9. The tool organizer of claim 6, wherein the tool belt includes a plurality of tool fasteners and associated tool indicia.

10. A tool organizer, comprising:
    a frame;
    a plurality of wheels attached to the frame;
    a plurality of tool storage structures removably supported by the frame, each tool storage structure comprising a plurality of storage panels, each storage panel comprising at least one tool fastener for securing a specific tool, each tool storage structure including a tool indicia associated with each tool fastener, and the plurality of storage panels movable with respect to one another between a closed configuration and an open configuration; and
    wherein a first tool fastener and a first associated tool indicia are disposed on a first side of a first storage panel, and a second tool fastener and a second associated tool indicia are disposed on a second side of the first tool panel.

11. The tool organizer of claim 10, wherein the storage panels are disposed vertically.

12. The tool organizer of claim 10, wherein a first tool fastener and a first associated tool indicia are disposed on a first side of a first storage panel, and a second tool fastener and a second associated tool indicia are disposed on a second side of the first tool panel.

13. The tool organizer of claim 10, wherein each storage panel includes a handle.

14. The tool organizer of claim 10, wherein a first storage panel and a second storage panel comprise a retaining means for securing the plurality of storage panels.

15. A tool organizer, comprising:
    a frame;
    a plurality of wheels attached to the frame;
    a plurality of tool storage structures removably supported by the frame, each tool storage structure comprising a plurality of vertically disposed, hinged storage panels, each storage panel comprising at least one tool fastener for securing a tool, and the plurality of storage panels movable with respect to one another between a closed configuration and an open configuration; and
    wherein a first tool fastener and a first associated tool indicia are disposed on a first side of a first storage panel, and a second tool fastener and a second associated tool indicia are disposed on a second side of the first tool panel.

* * * * *